United States Patent
Tsai et al.

(10) Patent No.: US 10,112,327 B2
(45) Date of Patent: Oct. 30, 2018

(54) HOUSING OF AN LED DISPLAY DEVICE AND METHOD FOR MANUFACTURING THE SAME

(71) Applicants: LITE-ON OPTO TECHNOLOGY (CHANGZHOU) CO., LTD., Jiangsu Province (CN); LITE-ON TECHNOLOGY CORP., Taipei (TW)

(72) Inventors: Cheng-Han Tsai, Taipei (TW); Shih-Yuan Kuo, Taipei (TW); Shuo-Hung Chen, Taipei (TW); Ju-Ling Cheng, Taipei (TW)

(73) Assignees: Lite-On Opto Technology (Changzhou) Co., Ltd., Jiangsu Province (CN); Lite-On Technology Corp., Taipei (TW)

( * ) Notice: Subject to any disclaimer, the term of this patent is extended or adjusted under 35 U.S.C. 154(b) by 510 days.

(21) Appl. No.: 14/690,555

(22) Filed: Apr. 20, 2015

(65) Prior Publication Data

US 2015/0306799 A1 Oct. 29, 2015

(30) Foreign Application Priority Data

Apr. 28, 2014 (CN) .......................... 2014 1 0176231

(51) Int. Cl.
| | |
|---|---|
| *B29C 45/00* | (2006.01) |
| *B29C 45/16* | (2006.01) |
| *B29L 31/34* | (2006.01) |
| *B29K 63/00* | (2006.01) |
| *B29C 45/04* | (2006.01) |

(52) U.S. Cl.
CPC ........ *B29C 45/0053* (2013.01); *B29C 45/162* (2013.01); *B29C 45/0441* (2013.01); *B29C 2045/0079* (2013.01); *B29K 2063/00* (2013.01); *B29K 2995/0026* (2013.01); *B29L 2031/3475* (2013.01)

(58) Field of Classification Search
None
See application file for complete search history.

(56) References Cited

U.S. PATENT DOCUMENTS

| | | | | |
|---|---|---|---|---|
| 2001/0005063 A1* | 6/2001 | Neter | .................. | B29C 35/16 264/348 |
| 2011/0272833 A1* | 11/2011 | Tsai | .................. | B29C 45/16 264/1.9 |

OTHER PUBLICATIONS

Fairuz, https://www.slideshare.net/fairuzlaaa/sand-casting-28523370, Retrieved Sep. 26, 2017, Published on Nov. 22, 2013 (Year: 2013).*

* cited by examiner

*Primary Examiner* — Francisco W Tschen
(74) *Attorney, Agent, or Firm* — Rosenberg, Klein & Lee

(57) ABSTRACT

A method for manufacturing a housing of an LED display device includes the steps of: (a) filling a first material into a first mold assembly at a first place to form a cover with a plurality of first display holes, followed by moving the cover to a second place, filling a second material into a second mold assembly and the cover to seal one of the plurality of the first display holes via a plurality of first transparent members; and (b) disposing an ink layer on a display side of the cover in such a manner that the ink layer covers the display side of the cover and that the first transparent member in each of the first display holes is exposed from the ink layer.

6 Claims, 15 Drawing Sheets

HOUSING OF AN LED DISPLAY DEVICE AND METHOD FOR MANUFACTURING THE SAME

CROSS-REFERENCE TO RELATED APPLICATION

This application claims priority of Chinese Patent Application No. 201410176231.8, filed on Apr. 28, 2014, the entire disclosure of which is hereby incorporated by reference.

FIELD OF THE INVENTION

This invention relates to a housing of a display device, more particularly to a housing of an LED display device and a method for manufacturing the same.

BACKGROUND OF THE INVENTION

The conventional procedure for manufacturing a conventional housing of an LED display device is shown as the follows, first injection molding to form a cover, printed an ink on a display side, then second injection molding to form a transparent member within display holes of the cover. However, it includes the step of manual disposition of the cover from one mold assembly to another mold assembly, and is relatively time-consuming and cost-ineffective. Moreover, if the second injection molding process is not successful, the defective housing is difficult to be recycled since the display side of the cover has already been printed with the ink layer.

SUMMARY OF THE INVENTION

Therefore, an object of the present invention is to provide a method for manufacturing a housing of an LED display device that is able to reduce manufacturing time and an LED display device manufactured via a spin double injection machine with first and second mold assemblies corresponding to thereof. Thus, the repair process for the display housing will be easy to be introduced. Then, the step of ink process can be disposed after these molding processes.

BRIEF DESCRIPTION OF THE DRAWINGS

Other features and advantages of the present invention will become apparent in the following detailed description of the embodiments of this invention, with reference to the accompanying drawings, in which.

DETAILED DESCRIPTION OF THE EMBODIMENTS

Figure 1:
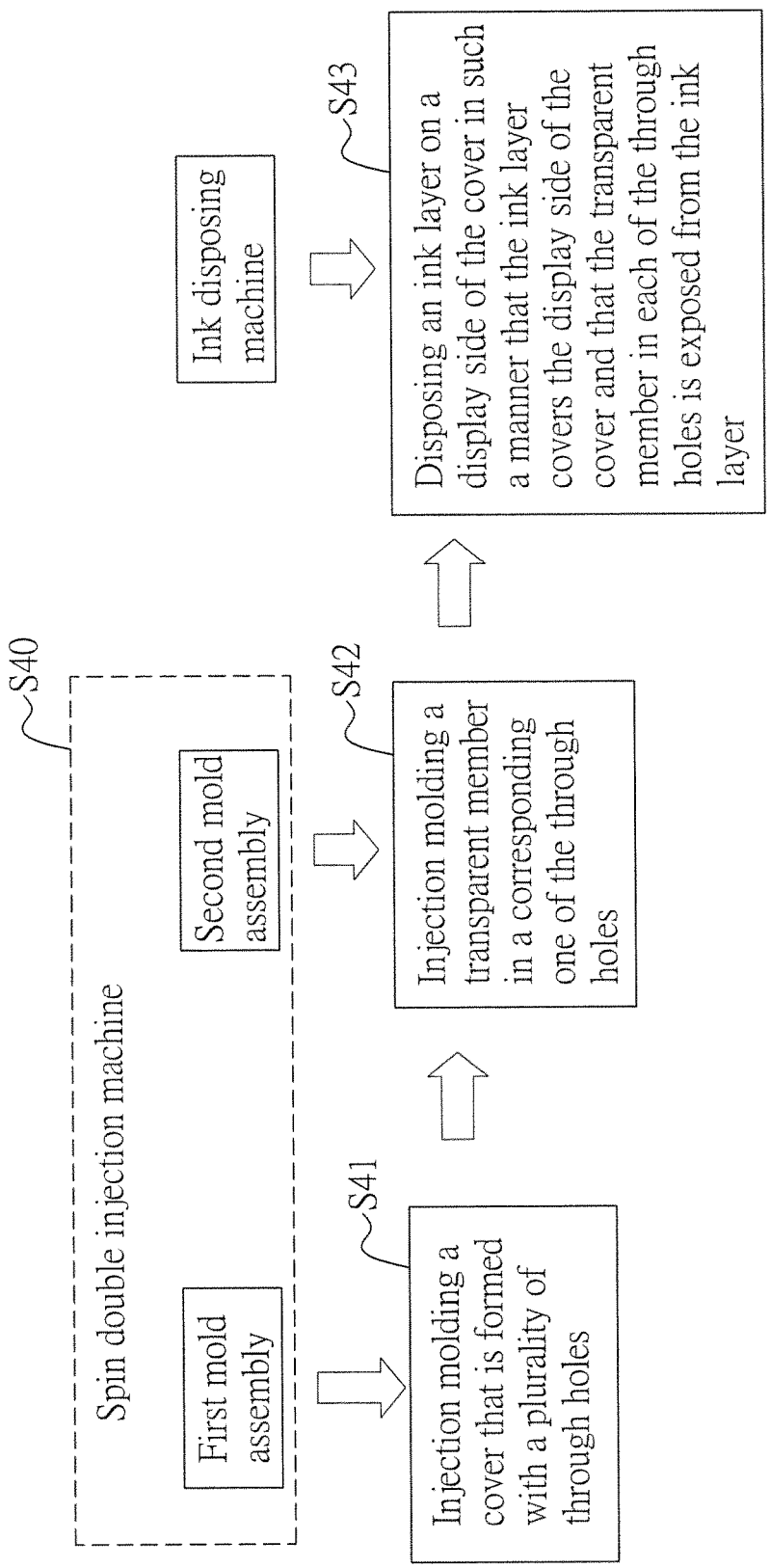
FIG. 1 is a flowchart of the first embodiment of a method for manufacturing a housing of an LED display device according to this invention.

Before the present invention is described in greater detail, it should be noted that like elements are denoted by the same reference numerals throughout the disclosure.

Figure 2:
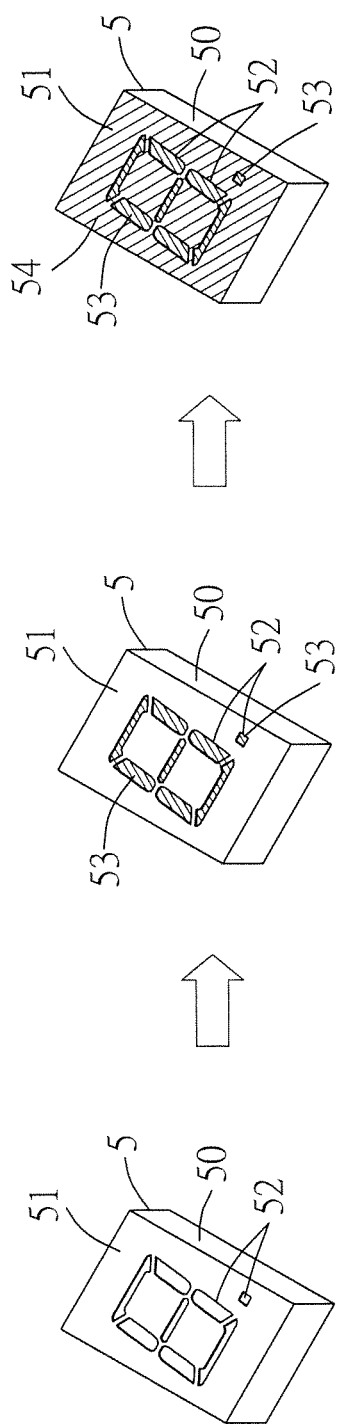
FIG. 2 shows perspective views of the first embodiment.

Referring to FIGS. 1 and 2, the first embodiment of a method for manufacturing a housing of an LED display device according to the present invention is adapted to manufacture a housing of a seven-segment display (abbreviated as a display housing hereinafter), which uses LED chips as its light source. However, the method of this invention can be used to manufacture a housing of any suitable display device, and is not limited to the seven-segment display. It is worth noting that, in this embodiment, a spin double injection machine is used to manufacture the display housing.

Figure 3:
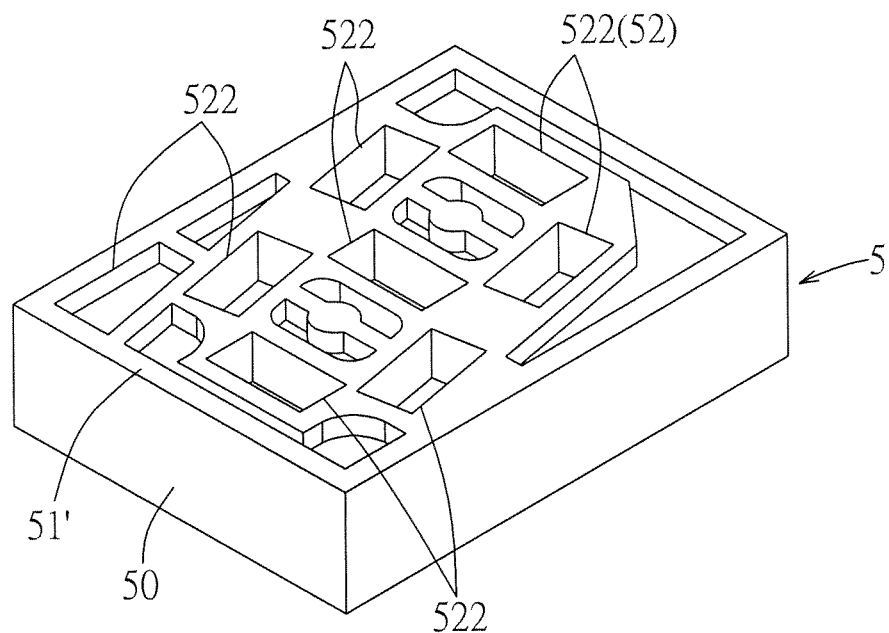
FIGS. 3-4 are perspective views showing a back side and a display side of a cover made by the first embodiment.
Figure 4:
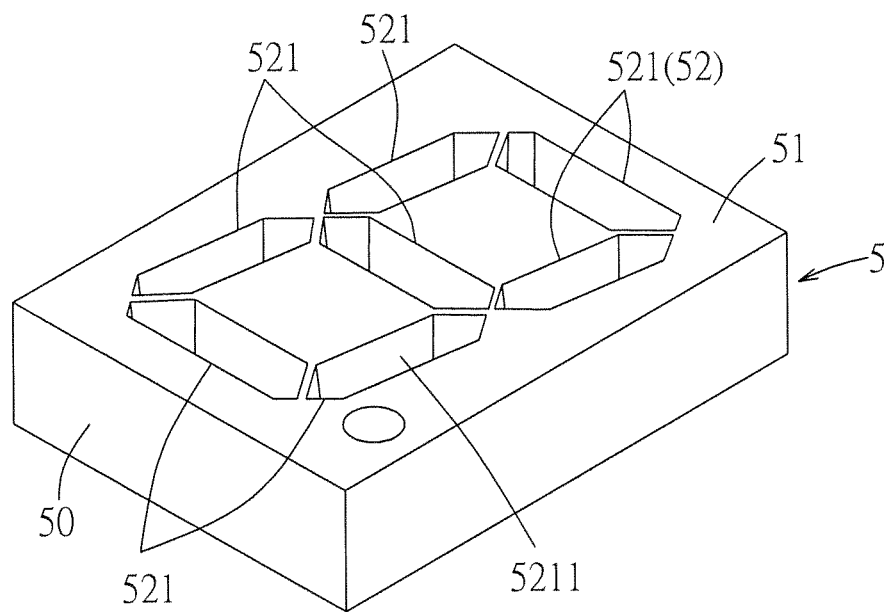
Figure 5:
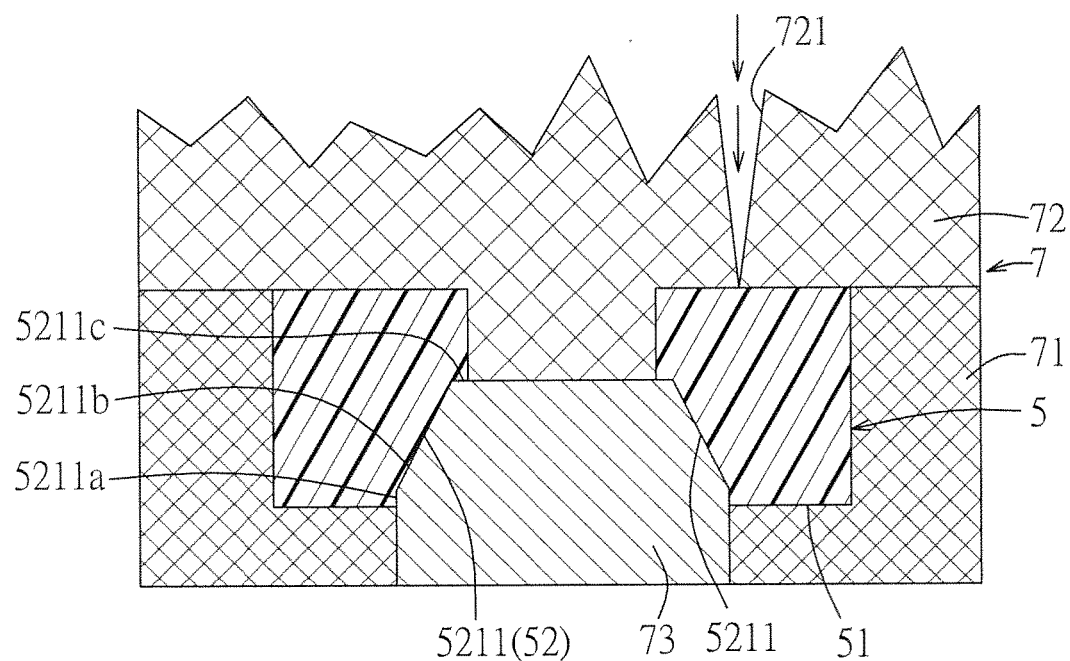
FIGS. 5-7 are fragmentary schematic sectional views showing sequential steps of forming a housing of an LED display device using a first mold assembly and a following second mold assembly of the first embodiment.

The spin double injection machine includes first and second mold assemblies 7, 9 (see FIGS. 5 and 6) that could be operated simultaneously. Referring to FIG. 1, Step S40 includes providing the first mold assembly 7 with a first formation cavity for injection molding a cover 5 and the second mold assembly 9 for injection molding a plurality of transparent members 53 combined into the cover. The cover 5 can be, for example but not limited to, a reflective cover or a light absorption cover. As shown in FIGS. 1 to 3, Step S41 includes filling a first material into the first formation cavity defined by the first mold assembly 7 at a first place to form the cover 5 with a plurality of through holes 52. The cover 5 has a display side 51, a back side 51' opposite to the display side 51 and a lateral side 50 interconnecting the display side 51 and the back side 51'. Referring to FIGS. 3 and 4, the cover 5 is the main structure of the display device, and is formed with the through holes 52 that extend through the display side 51 and the back side 51'. Each through hole 52 includes a display hole 521 adjacent to the display side 51 and a containing hole 522 adjacent to the back side 51' for containing the LED chips. The display holes 521 are substantially arranged in a pattern having at least one 8-shape and a decimal point (as best shown in FIG. 4). Each of the display holes 521 is bounded by a hole wall 5211. FIG. 5 is a fragmentary schematic sectional view showing formation of the cover 5 with the display holes 521 (only one of the display holes 521 is shown in FIG. 5) using the first mold assembly 7. The first mold assembly 7 includes a movable mold 71, a first stationary mold 72 and a core mold 73 extending through the movable mold 71 for forming the display holes 521. The movable mold 71, the first stationary mold 72 and the core mold 73 cooperatively define the first formation cavity. The shape of the core mold 73 defines the shape of the hole wall 5211 and thus defines the main contour of each of the display holes 521. As shown in FIG. 5, in this embodiment, the hole wall 5211 includes a non-diverging portion 5211a that is directly and perpendicularly connected to the display side 51 of the cover 5, a tapered portion 5211b that is tapered from the non-diverging portion 5211a toward the back side 51' and away from the display side 51, and a horizontal portion 5211c that extends horizontally from an end of the tapered portion 5211b. The non-diverging portion 5211a of the hole wall 5211 has a depth of at least 0.2 mm. The configuration of the non-diverging portion 5211a, the tapered portion 5211b and the horizontal portion 5211c are designed to meet subsequent manufacturing condition and to facilitate mold release procedure.

To be more specific, the Step S41 includes filling the first material into the first formation cavity through a sprue channel 721 of the first stationary mold 72 to form the cover 5.

The Step S41 further includes abutting against the display side 51 and the lateral side 50 of the cover 5 via the movable mold 71. Then, moving the cover 5 along with the movable mold 71 of the first mold assembly 7 (e.g., rotating at a pre-determined angle or along a pre-determined path) by the spin double injection machine to a second place where the second mold assembly 9 is provided and where the movable mold 71 cooperates with the second mold assembly 9 to clamp the cover 5 therebetween (see FIG. 6). The second mold assembly 9 includes a second stationary mold 91 to cover the back side 51' of the cover 5 and the movable mold 71, a plurality of protrusion molds 92 respectively extending into the containing holes 522 of the cover 5 from the back side 51', and a plurality of molding projections 93 that are opposite to the second stationary mold 91 and that extend through the movable mold 71 to respectively project into the display holes 521 of the through holes 52. To be specific, the display hole 521 cooperates with the containing hole 522 to define the through hole 52. Each of the molding projections 93 has a forming surface 931 that faces a respective one of the display holes 521 and that is non-coplanar with the display side 51 of the cover 5. In this embodiment, the level difference between the forming surface 931 and the display side 51 of the cover 5 is no less than 0.2 mm. Further, each of the molding projections 93 abuts against the non-diverging portion 5211a of the hole wall 5211 and terminates at a border between the non-diverging portion 5211a and the tapered portion 5211b so as to form a level difference between the display side 51 of the cover 5 and the transparent member 53 after the transparent member 53 is formed. It should be noted that the configuration of the tapered portion 5211b and the horizontal portion 5211c are advantageous for the adhesion between the cover 5 and the transparent member 53.

Figure 7:
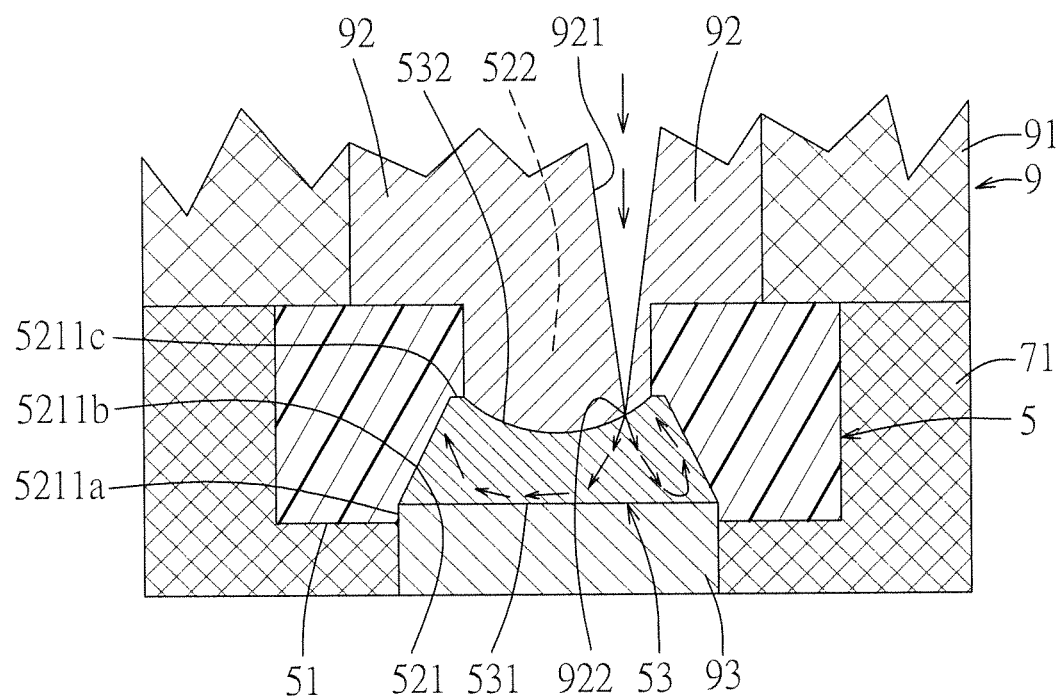

Afterward, as shown in FIG. 1, the Step S42 (i.e., second injection molding process) includes filling a second material into a second formation cavity defined by the second mold assembly 9 and the cover 5 to seal one of the display holes 521 of the through holes 52 via a corresponding one of the transparent members 53. To be more specific, the Step S42 includes filling the second material into a respective one of the display holes 521 of the through holes 52 through a sprue channel 921 of the protrusion molds 92 of the second mold assembly 9 to form the transparent members 53. As shown in FIGS. 2 and 7, by virtue of the arrangement of the forming surface 931 of each of the molding projections 93, an outer surface 531 of the transparent member 53 in each of the display holes 521 is indented from the display side 51 of the cover 5 such that the outer surface 531 of the transparent member 53 is non-coplanar with the display side 51 of the cover 5. As mentioned above, the level difference between the outer surface 531 of the transparent member 53 and the display side 51 of the cover 5 is no less than 0.2 mm.

Thereafter, S43 includes disposing an ink layer 54 (for example, a black ink or a specific colored ink) on the display side 51 of the cover 5 using an ink disposing machine so as to form the display housing (see Step S43 of FIG. 1 and FIG. 2). Since the outer surface 531 of the transparent member 53 is indented from the display side 51 of the cover 5, the ink layer 54 merely covers the display side 51 of the cover 5 and the transparent member 53 in each of the display holes 521 is exposed from the ink layer 54. In other words, the ink layer 54 covers the display side 51 of the cover 5 without extending to the transparent member 53. In addition, the ink exists on the display side 51 of the cover 5 excluding the transparent member 53 of the display holes 521 in this embodiment. As a result, there is no need to worry about the ink layer 54 undesirably covering the transparent member 53 in each of the display holes 521.

Furthermore, as shown in FIG. 7, in this embodiment, the protrusion molds 92 of the second mold assembly 9 of the spin double injection machine respectively extend into the containing holes 522 of the cover 5, and the sprue channel 921 of each of the protrusion molds 92 has an injecting end 922 offset from a central axis of the respective one of the containing holes 522 of the through holes 52. As such, after injecting the second material for the transparent member 53 into each of the display holes 521 through the sprue channel 921, a cut-off point is formed at a side portion of an inner surface 532 of the transparent member 53 and is away from the central axis of each of the containing holes 522 (i.e., away from a central axis of the transparent member 53). Therefore, when light emitted from LED chips under the transparent members 53 of the containing holes 522 passes through the transparent members 53, the light spot phenomenon can be avoided.

Besides, when the second mold assembly 9 of the spin double injection machine is operated to form the transparent member 53, the first stationary mold 72 and the core mold 73 of the first mold assembly 7 could cooperate with another movable mold 71 to simultaneously form another cover 5, thereby enhancing the manufacturing efficiency. Moreover, the cover 5 filled with the transparent members 53 after the second injection molding process might be defective due to, e.g., incomplete sealing of the display holes 521 with the transparent members 53. In this invention, the defective cover 5 could be recycled since the display side 51 of the cover 5 has yet to be printed with the ink layer 54, thereby reducing manufacturing costs.

Figure 8:
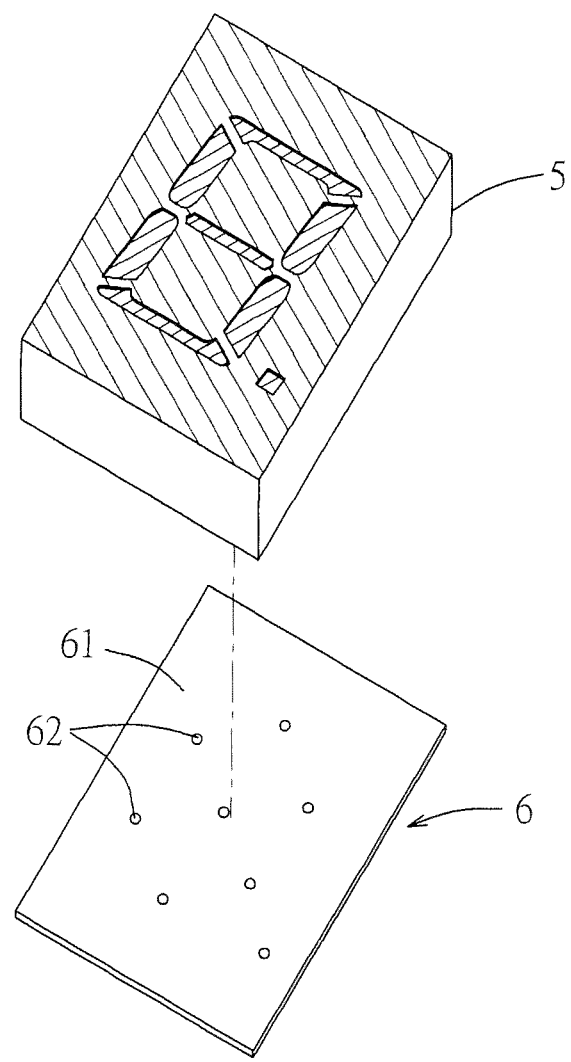
FIG. 8 is a perspective view showing a housing of an LED display device produced by the first embodiment and mounted on an LED module.

Finally, as shown in FIG. 8, the display housing is removed from the second mold assembly 9 and is assembled with an LED module 6 via, e.g., heat stake, thereby completing an LED display device. The LED module 6 mainly includes a circuit board 61 and a plurality of LED chips 62 each of which is mounted on the circuit board 61 and is disposed under the transparent member 53 in a respective one of the containing holes 522 such that light emitted from the LED chips 62 is reflected by the hole wall 5211 and focused, followed by passing through the transparent member 53 and emitting outwardly from the outer surface 531 of the transparent member 53.

Figure 9:
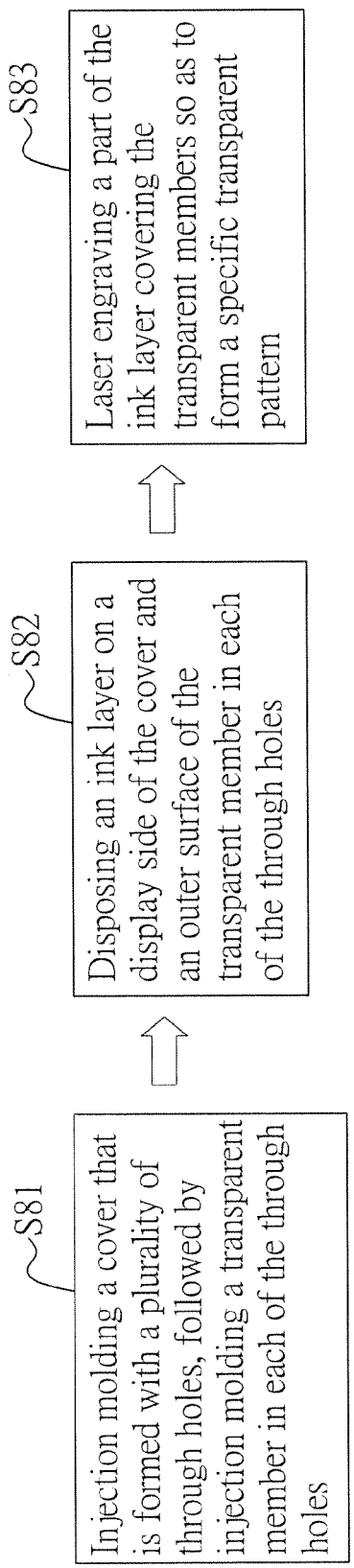
FIG. 9 is a flowchart of the second embodiment of a method for manufacturing a housing of an LED display device according to this invention.
Figure 10:
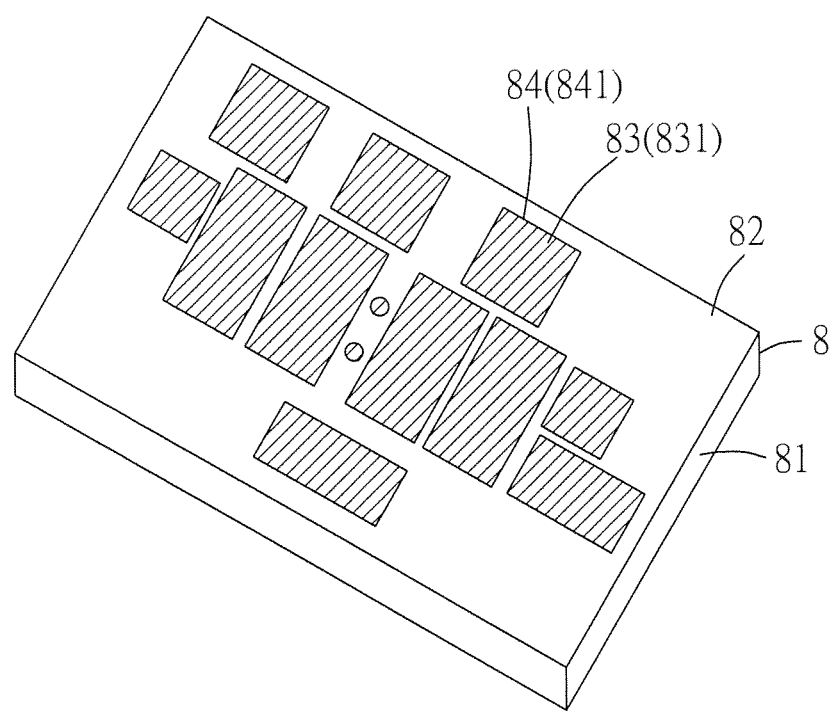
FIG. 10 is a schematic view showing a cover made by the second embodiment.

FIGS. 9 to 13 show the second embodiment of a method for manufacturing a housing of an LED display device according to this invention. First, as shown in FIGS. 9 and 10, a cover 8 that has a display side 82, a back side opposite to the display side 82 and a lateral side 81 interconnecting the display side 82 and the back side is injection molded using a spin double injection machine. The cover 8 is formed with a plurality of through holes 84 that extend through the display side 82 and the back side. Each through hole 84 includes a display hole 841 adjacent to the display side 82 and a containing hole 522 adjacent to the back side for containing the LED chips. A transparent member 83 is then injection molded into the display holes 841 to seal the display holes 84.

Figure 6:
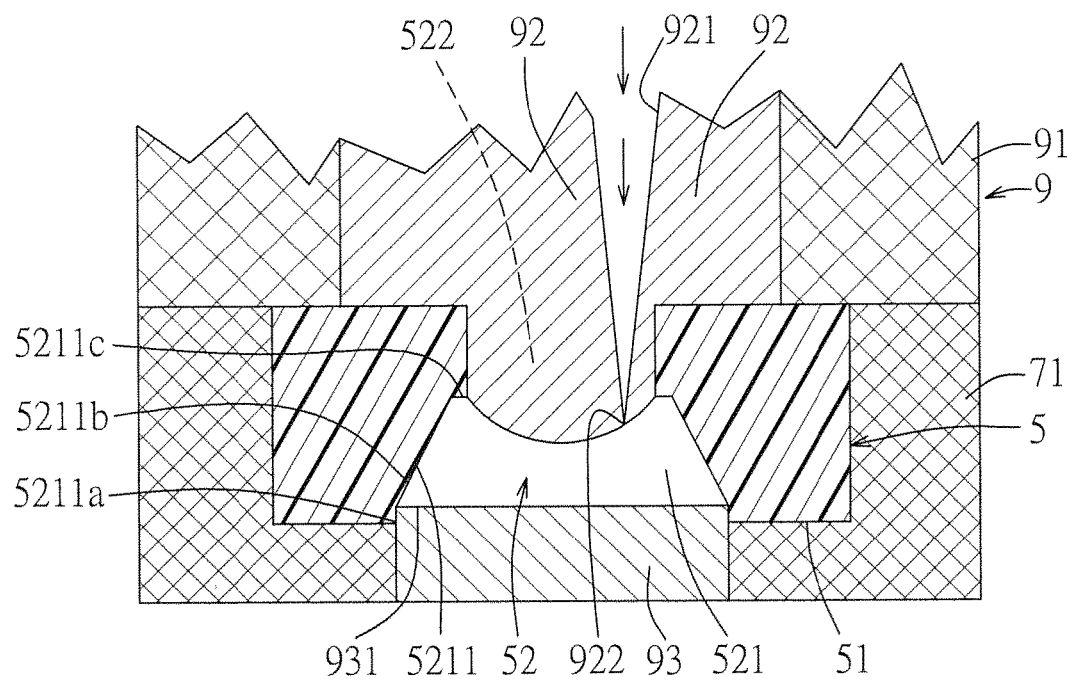

The spin double injection machine used in the second embodiment is similar to that used in the first embodiment, and includes a first mold assembly 7 and a second mold assembly 9 (which are similar to those shown in FIGS. 5 and 6). The cover 8 is injection molded using the first mold assembly 7, followed by moving the cover 8 to the second mold assembly 9 and injection molding the transparent member 83 in each of the display holes 841 using the second mold assembly 9. The differences between the second embodiment and the first embodiment reside in that the second mold assembly 9 includes a plurality of molding projections 93' extending through the movable mold 71 oppositely of the second stationary mold 91 (see FIG. 11) and each of the molding projections 93' has a forming surface 931' that faces a respective one of the display holes 841 and that is co-planar with the display side 82 of the cover 8 such that an outer surface 831 of the transparent member 83 in each of the display holes 841 is flush with the display side 82 of the cover 8.

Moreover, in this embodiment, the cover 8 could be formed using a conventional injection molding machine. A transparent resin, e.g., epoxy resin, is then filled into the display holes 841 of the cover 8, followed by solidification to form the transparent member 83 in each of the display holes 841. In this embodiment, the transparent member 83 is not indented from the display side 82 of the cover 8, i.e., the outer surface 831 of the transparent member 83 is flush with the display side 82 of the cover 8.

Figure 12:
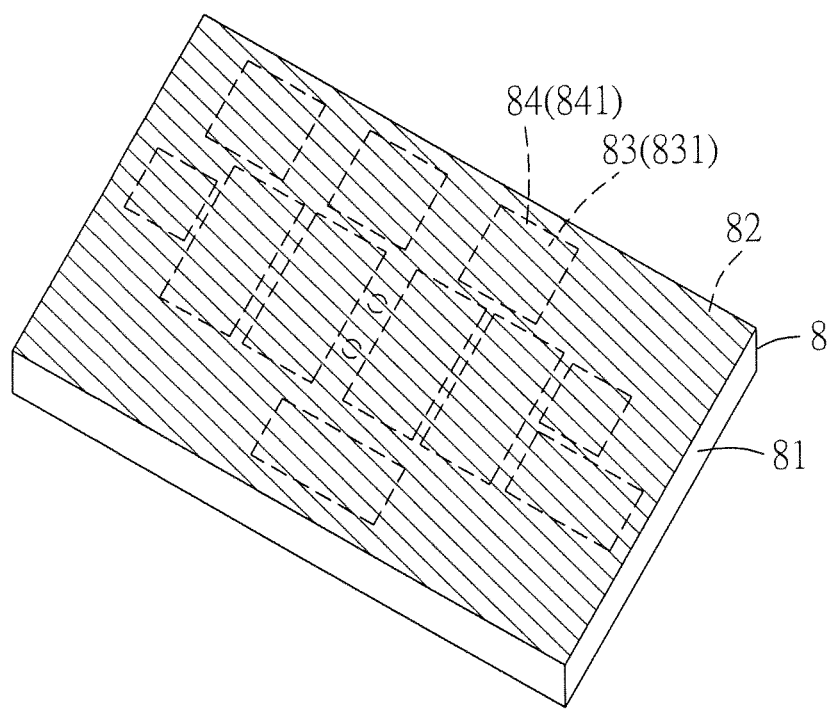
FIG. 12 is a perspective view showing a step of disposing an ink layer on a display side of the cover and an outer surface of a transparent member in each of the display holes of the cover according to the second embodiment.

Afterward, disposing an ink layer 85 on the display side 82 of the cover 8 and the outer surface 831 of the transparent member 83 in each of the display holes 841 using an ink disposing machine such that the ink layer 85 covers the display side 82 of the cover 8 and at least a part of the outer surface 831 of the transparent member 83 in each of the display holes 841 (see Step S82 of FIG. 9 and FIG. 12).

Then, laser engraving a part of the ink layer 85 covering the transparent members 83 in each of the display holes 841 of the through holes 84 using a laser engraving machine so as to forma specific light transparent pattern 86 (see FIG. 13), thereby obtaining the housing of the LED display device. That is to say, the specific light transparent pattern is formed on the ink layer 85 via a laser engraving process. Therefore, when a relatively complicated pattern is required to be formed on the cover 8, there is no need to use a precise and expensive mold assembly or an expensive plastic film as described in the prior art. Moreover, the pattern can be changed easily due to the use of the laser engraving techniques. As a result, the production efficiency could be enhanced, and the manufacturing costs could be reduced as well.

Figure 13:
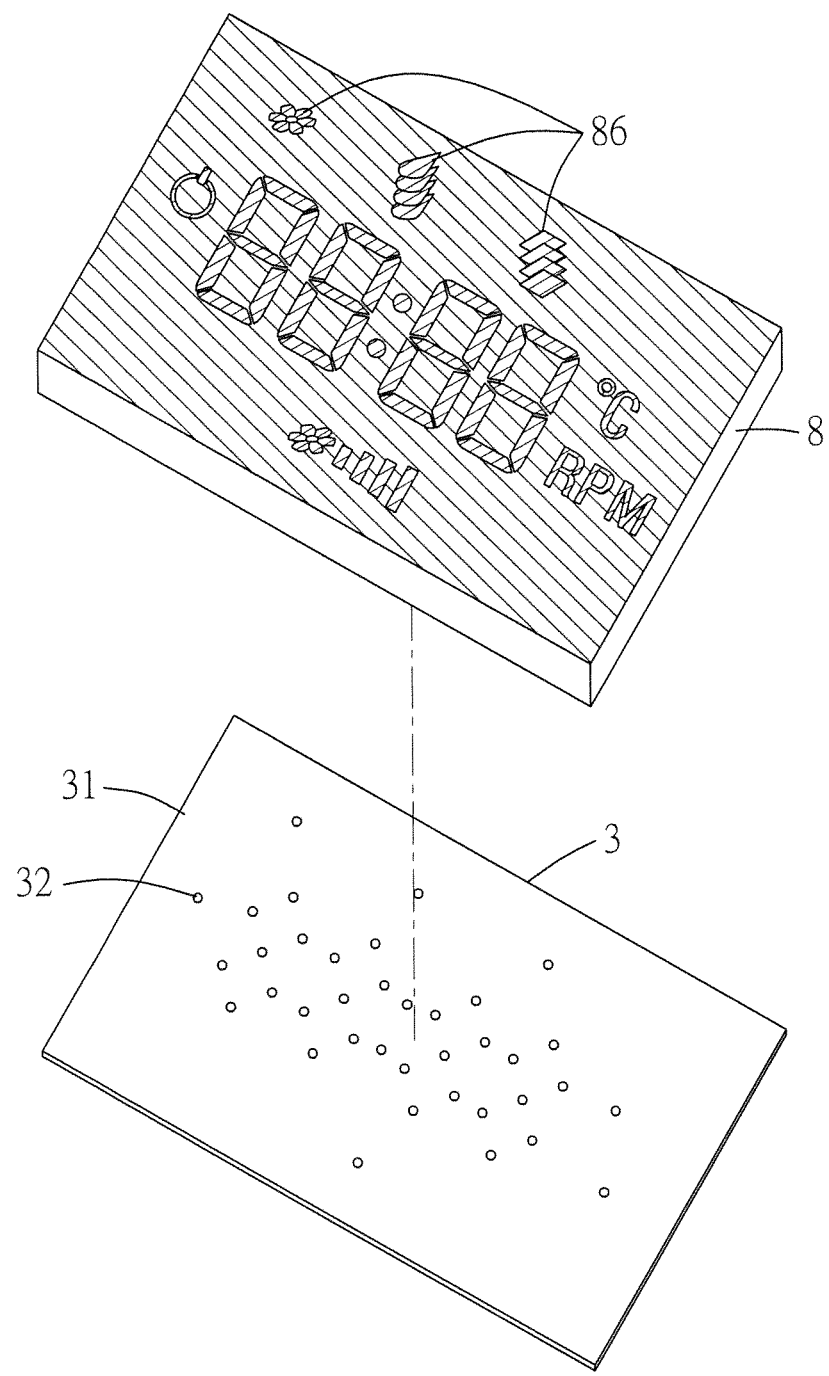
FIG. 13 is a schematic view showing a step of laser engraving apart of the ink layer covering the transparent member so as to form a specific light transparent pattern according to the second embodiment.
Figure 14:
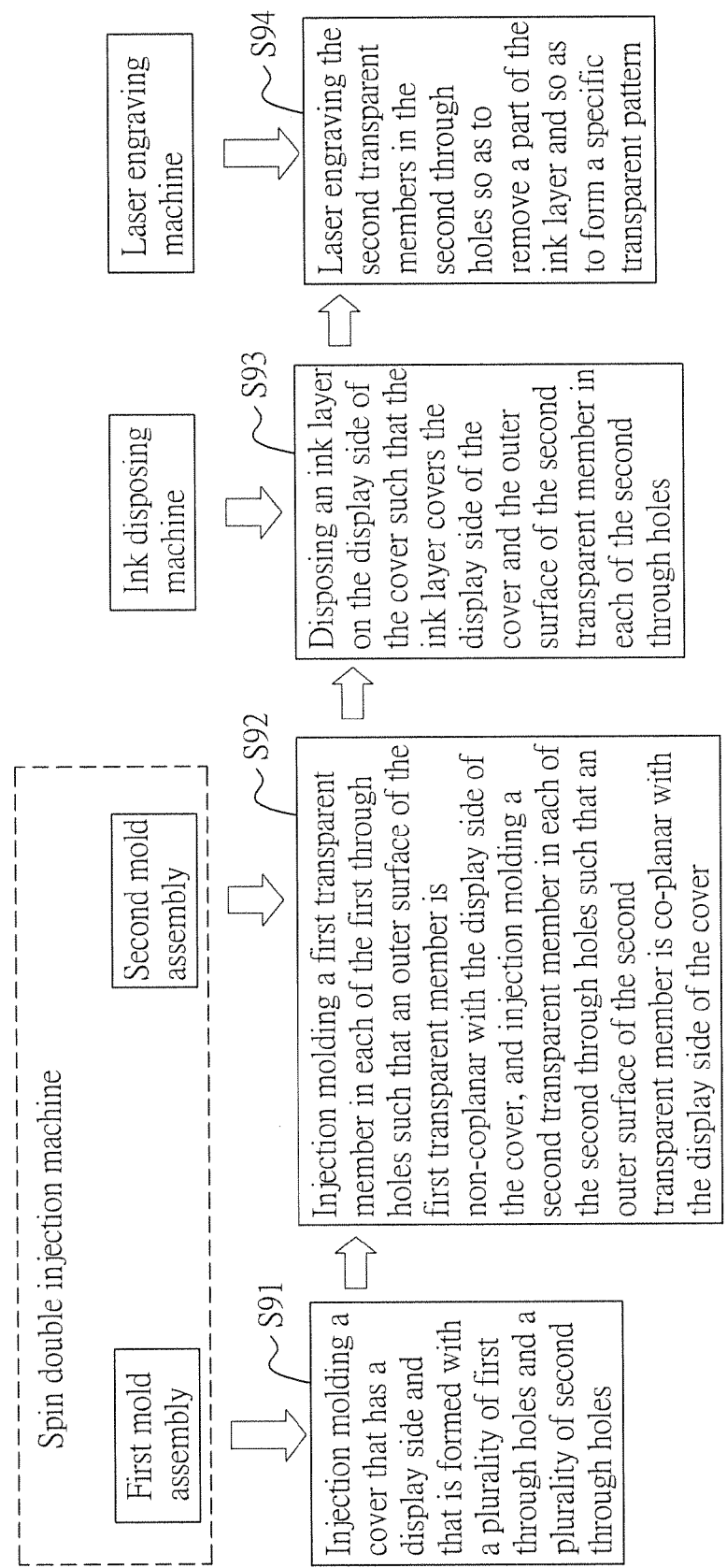
FIG. 14 is a flowchart of the third embodiment of a method for manufacturing a housing of an LED display device according to this invention.

Moreover, as shown in FIG. 13, the housing can be assembled with a LED module 3 that includes a circuit board 31 and a plurality of LED chips 32. Each of the LED chips 32 is mounted on the circuit board 31 and is disposed under the transparent member 83 in a respective one of the containing holes 842, thereby completing an LED display device.

Figure 11:
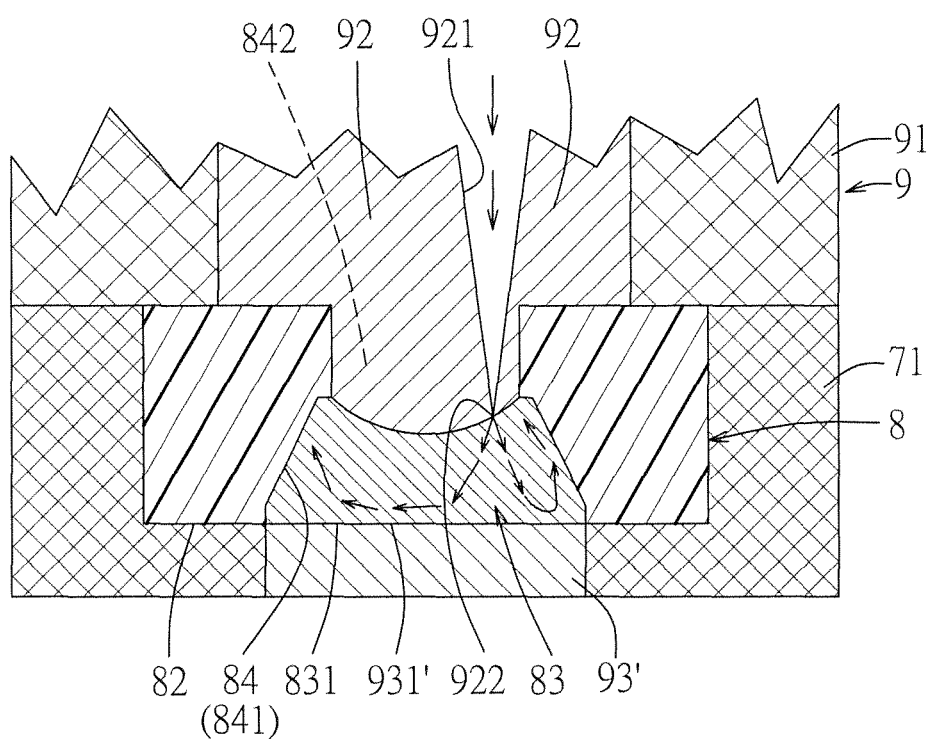
FIG. 11 is a fragmentary schematic sectional view showing the positional arrangement among the cover, a movable mold of a first mold assembly and a second mold assembly of the second embodiment, in which a transparent member is injection molded in each of the display holes of the cover.
Figure 15:
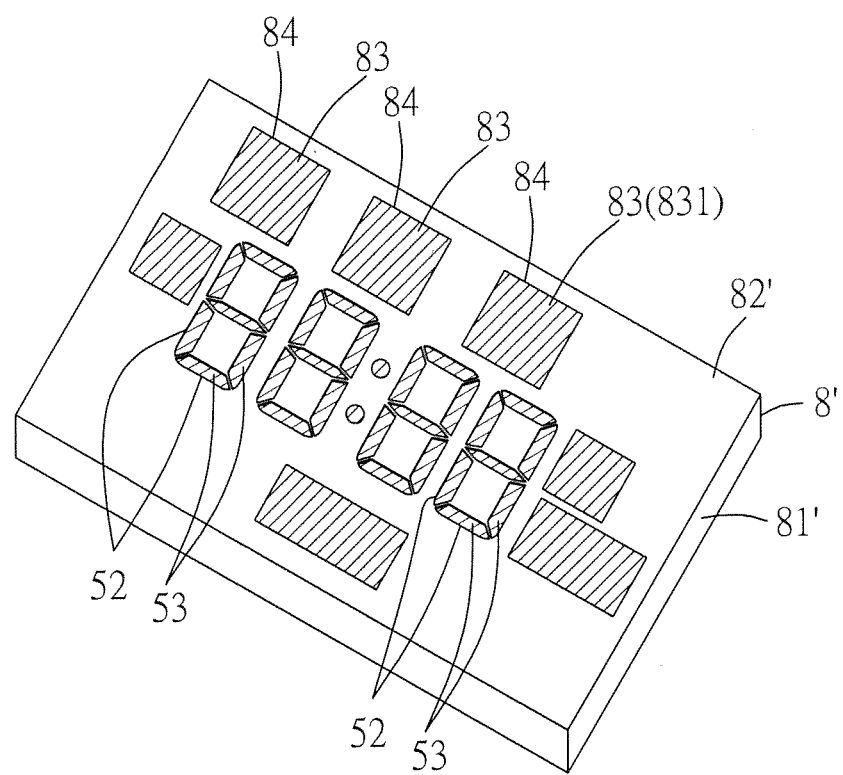
FIGS. 15-17 are schematic views showing an injection molded cover, an ink layer disposed on a display side of the cover, and a specific light transparent pattern on the ink layer of a second transparent member according to the third embodiment.
Figure 16:
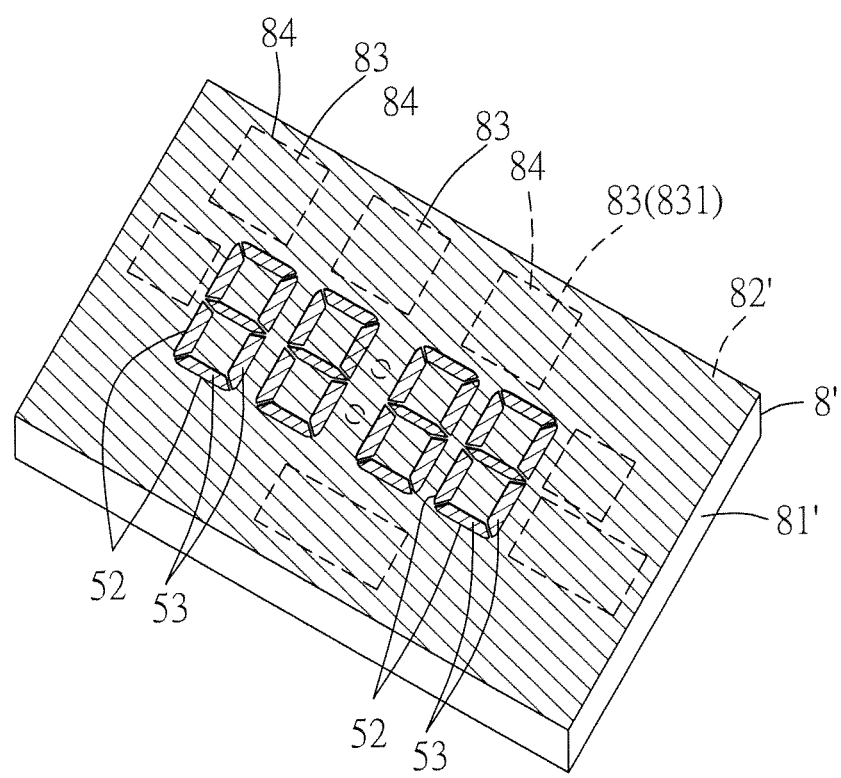
Figure 17:
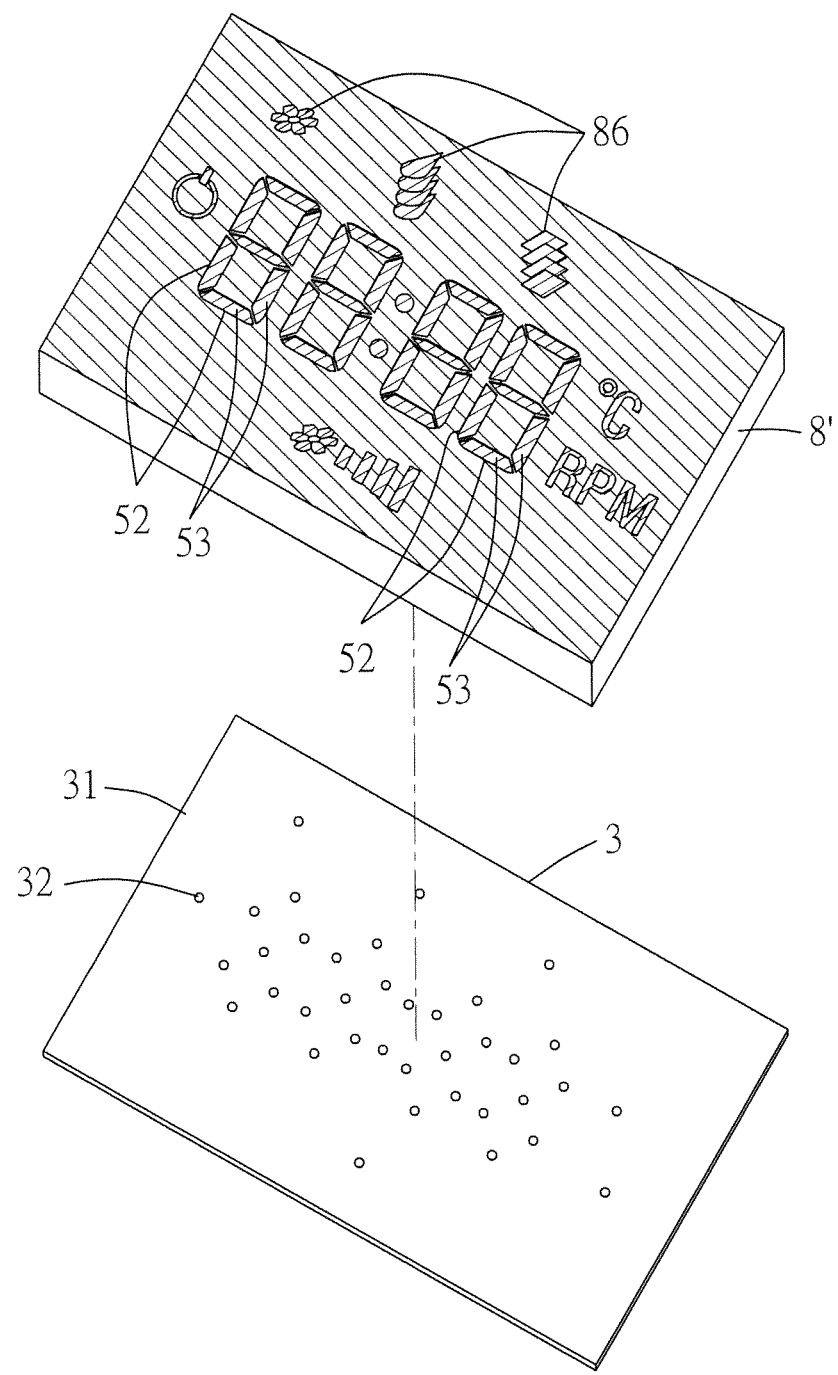

FIGS. 14 to 17 show the third embodiment of a method for manufacturing a housing of an LED display device according to this invention. Similar to the previous embodiments, a cover 8' is injection molded using a first mold assembly (which is similar to that shown in FIG. 5) and is formed with a plurality of first through holes 52 and a plurality of second through holes 84, as best shown in FIG. 15 (Step S91). Each first through hole 52 includes a display hole 521 adjacent to the display side 82 and a containing hole 522 adjacent to the back side. Each second through hole 84 includes a display hole 841 adjacent to the display side 82 and a containing hole 842 adjacent to the back side. In this embodiment, the second mold assembly includes a plurality of first molding projections 93 (the same as the molding projections of the first embodiment) and a plurality of second molding projections 93' (the same as the molding projections of the second embodiment). Therefore, the second mold assembly in this embodiment includes a plurality of protrusion molds 92 respectively extending into the first and second containing holes 522, 842 of the cover 8', a second stationary mold 91 to cover the back side of the cover 8' and the movable mold 71, a plurality of the first molding projections 93 that are opposite to the second stationary mold 91 and that extend through the movable mold 71 to respectively project into the first display holes 521 (as shown in FIG. 7), and a plurality of the second molding projections 93' extending through the movable mold 71 to respectively project into the second display holes 841 (as shown in FIG. 11). When the second injection molding process (i.e., Step S92) is carried out, a first transparent member 53 is injection molded in each of the first display holes 521 using the second mold assembly such that an outer surface 531 of the first transparent member 53 is non-coplanar with the display side 82' of the cover 8' (similar to FIG. 7). At the same time, a second transparent member 83 is injection molded in each of the second display holes 841 using the second mold assembly such that an outer surface 831 of the second transparent member 83 is co-planar with the display side 82' of the cover 8' (similar to FIG. 11). That is to say, the cover 8' is provided with the first and second transparent members 53, 83 with different surface levels. As such, when an ink layer 85 is disposed on the display side 82' of the cover 8' using an ink disposing machine, the ink layer 85 covers the display side 82' of the cover 8' and the outer surface 831 of the second transparent member 83 in each of the second display holes 841 (see FIG. 16). Moreover, since the outer surface 531 of the first transparent member 53 is indented from the display side 82' of the cover 8', the ink layer 85 will not cover the first transparent member 53 in each of the first display holes 521. In this embodiment, the first transparent members 53 that are exposed from the ink layer 85 constitute four seven-segment elements (see FIG. 15). Subsequently, the second transparent members 83 in the second display holes 841 are laser engraved using a laser engraving machine so as to remove a part of the ink layer 85 and so as to form a specific light transparent pattern 86.

In this embodiment, the first transparent members 53 are formed into the seven-segment elements, while the specific light transparent patterns 86 are formed by laser engraving the ink layer 85 on the second transparent members 83 using a laser engraving machine. As such, production efficiency of the housing of the LED display device could be enhanced, and manufacturing costs could be reduced.

To sum up, in the first embodiment, by injection molding the cover 5 and the transparent member 53 using a spin double injection machine before disposing the ink layer 54 on the display side 51 of the cover 5, if the second injection molding process is not successful, the defective cover 5 could be recycled, thereby resulting in a decrease in material costs. Moreover, since the outer surface 531 of the first transparent member 53 in each of the first display holes 521 is indented from the display side 51 of the cover 5, the ink layer 54 will not cover the first transparent member 53 in each of the first display holes 521. Furthermore, the injecting end 922 of the protrusion molds 92 of the second mold assembly 9 is offset from the central axis of the respective one of the first display holes 521 so that the light spot phenomenon could be avoided. In addition, in the second and third embodiments, the transparent member 83 in each of the display holes 84 is disposed with the ink layer 85, and the ink layer 85 on the transparent member 83 is then laser engraved to form the specific light transparent pattern so that a precise and expensive mold assembly that forms complicated patterns or an expensive plastic film that is printed with the complicated pattern can be dispensed with, thereby enhancing production efficiency and reducing manufacturing costs for the housing. Therefore, the object of this invention is achieved.

While the present invention has been described in connection with what are considered the most practical embodiments, it is understood that this invention is not limited to the disclosed embodiments but is intended to cover various arrangements included within the spirit and scope of the broadest interpretation and equivalent arrangements.

What is claimed is:

1. A method for manufacturing a housing of an LED display device, comprising:
   (a) providing a first mold assembly with a first formation cavity for injection molding a cover and a second mold assembly with a plurality of first molding projections for injection molding a plurality of first transparent members, filling a first material into the first formation cavity defined by the first mold assembly at a first position to form the cover with a plurality of first through holes, followed by moving the cover to a second position, filling a second material into a second formation cavity defined by the second mold assembly and the cover to seal one of the plurality of first through holes by forming a corresponding one of the first transparent members therein, each of the first molding projections of the second mold assembly projecting into a respective one of the first through holes and having a forming surface that faces the respective one of the first through holes and that is non-coplanar with a display side of the cover; and
   (b) disposing an ink layer on the display side of the cover in such a manner that the ink layer covers the display side of the cover with the first transparent member, which is disposed in each of the first through holes and recessed from the display side, to remain uncovered and thereby exposed by the ink layer;
   wherein the cover has a back side opposite to the display side and a lateral side interconnecting the display side and the back side, in process (a), the first mold assembly including a movable mold, a first stationary mold and a core mold extending through the movable mold, the movable mold, the first stationary mold and the core mold cooperatively defining the first formation cavity, and moving the cover along with the movable mold of the first mold assembly to the second position where the movable mold cooperates with the second mold assembly to clamp the cover therebetween; and
   wherein, in process (a), the second mold assembly includes a second stationary mold to cover the back side of the cover and the movable mold, the first molding projections being disposed opposite to the second stationary mold and extending through the movable mold, an outer surface of the first transparent member in each of the first through holes being indented from the display side of the cover, and wherein the ink layer covers the display side of the cover while leaving the first transparent member in each of the first through holes exposed in process (b).

2. The method as claimed in claim 1, further comprising filling the first material into the first formation cavity through a sprue channel of the first stationary mold to form the cover, abutting against the display side and the lateral side of the cover via the movable mold.

3. The method as claimed in claim 2, wherein the second mold assembly includes a plurality of protrusion molds respectively extending into the first through holes of the cover, filling the second material into a respective one of the first through holes through a sprue channel of the protrusion molds of the second mold assembly.

4. The method as claimed in claim 3, wherein, in process (a), the sprue channel of each of the protrusion molds of the second mold assembly has an injecting end offset from a central axis of the respective one of the first through holes.

5. The method as claimed in claim 1, wherein process (a) further includes forming a second through hole within the cover using the first mold assembly and injection molding a second transparent member in the second through hole using the second mold assembly, the second mold assembly further including at least one second molding projection extending through the movable mold oppositely of the second stationary mold, the second molding projection having a forming surface that faces the second through hole and that is co-planar with the display side of the cover such that an outer surface of the second transparent member in the second through hole is flush with the display side of the cover and such that, in process (b), the ink layer covers the display side of the cover and the outer surface of the second transparent member in the second through hole.

6. A method for manufacturing a housing of an LED display device, comprising:
   (a) providing a first mold assembly with a first formation cavity for injection molding a cover and a second mold assembly for injection molding a plurality of first transparent members, filling a first material into the first formation cavity defined by the first mold assembly at a first position to form the cover with a plurality of first through holes, followed by moving the cover to a second position, filling a second material into a second formation cavity defined by the second mold assembly and the cover to seal one of the plurality of first through holes by forming a corresponding one of the first transparent members therein;
   (b) disposing an ink layer on a display side of the cover in such a manner that the ink layer covers the display side of the cover with the first transparent member, which is disposed in each of the first through holes and recessed from the display side, to remain uncovered and thereby exposed by the ink layer;

wherein the cover has a back side opposite to the display side and a lateral side interconnecting the display side and the back side, in process (a), the first mold assembly including a movable mold, a first stationary mold and a core mold extending through the movable mold, the movable mold, the first stationary mold and the core mold cooperatively defining the first formation cavity, filling the first material into the first formation cavity through a sprue channel of the first stationary mold to form the cover, abutting against the display side and the lateral side of the cover via the movable mold, moving the cover along with the movable mold of the first mold assembly to the second position where the movable mold cooperates with the second mold assembly to clamp the cover therebetween;

wherein the second mold assembly includes a plurality of protrusion molds respectively extending into the first through holes of the cover, filling the second material into a respective one of the first through holes through a sprue channel of the protrusion molds of the second mold assembly;

wherein, in process (a), the second mold assembly includes a second stationary mold to cover the back side of the cover and the movable mold, and further includes a plurality of first molding projections disposed opposite to the second stationary mold and to extend through the movable mold and project into the first through holes, each of the first molding projections having a forming surface that faces respective ones of the first through holes and that is non-coplanar with the display side of the cover such that an outer surface of the first transparent member in each of the first through holes is indented from the display side of the cover and such that the ink layer covers the display side of the cover while leaving the first transparent member in each of the first through holes exposed in process (b);

wherein process (a) further includes forming a second through hole within the cover using the first mold assembly and injection molding a second transparent member in the second through hole using the second mold assembly, the second mold assembly further including at least one second molding projection extending through the movable mold oppositely of the second stationary mold, the second molding projection having a forming surface that faces the second through hole and that is co-planar with the display side of the cover such that an outer surface of the second transparent member in the second through hole is flush with the display side of the cover and such that, in process (b), the ink layer covers the display side of the cover and the outer surface of the second transparent member in the second through hole; and a process (c) of laser engraving a part of the ink layer covering the second transparent member in the second through hole so as to form a specific light transparent pattern.

* * * * *